Figure 5:
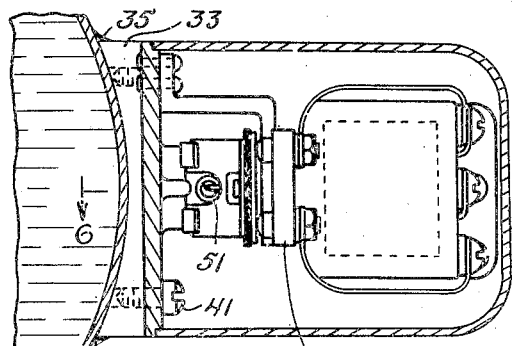

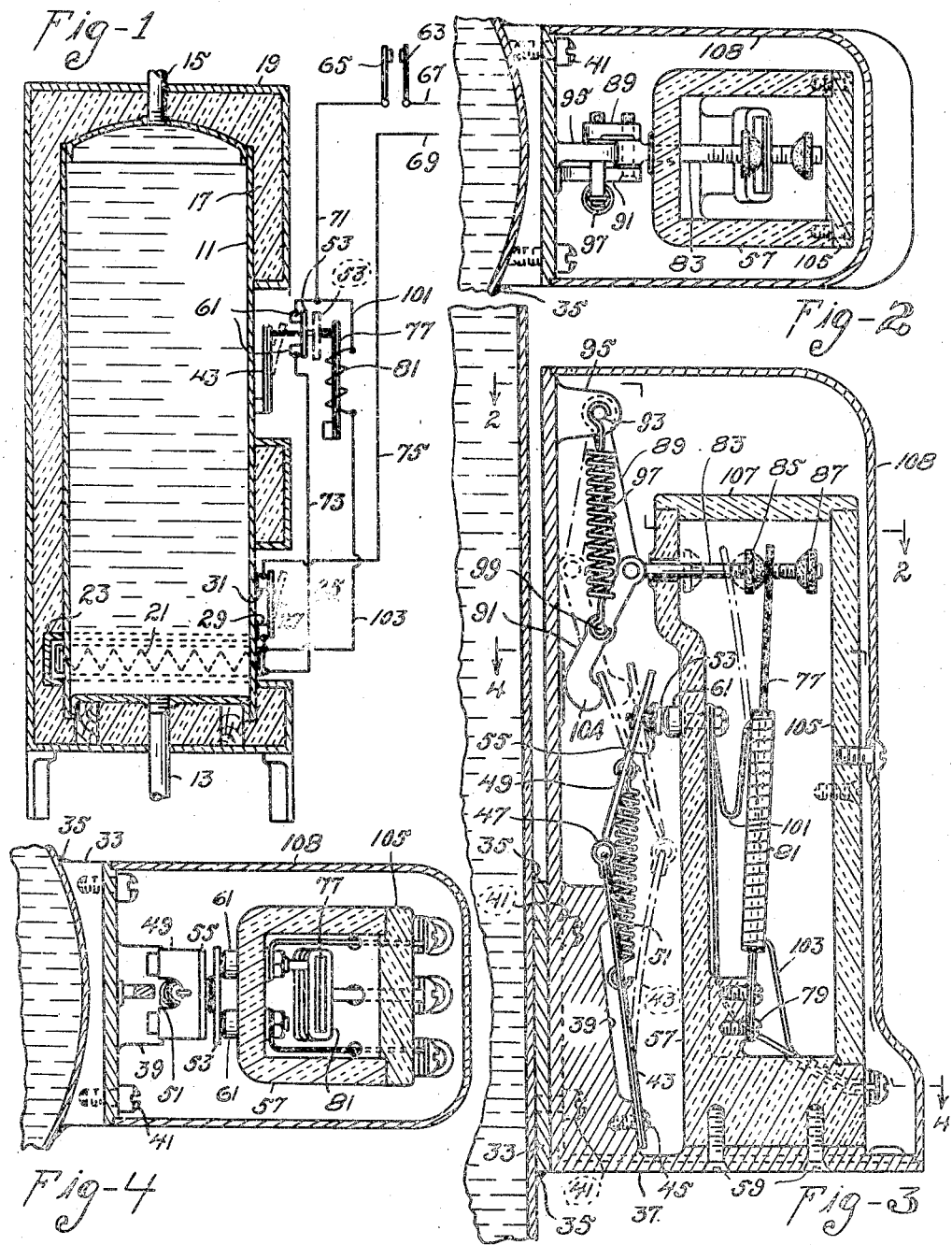

July 5, 1949.  C. M. OSTERHELD  2,475,291
THERMAL RETARDER MECHANISM
Filed June 11, 1945  2 Sheets-Sheet 2

INVENTOR.
CLARK M. OSTERHELD
BY
*H. M. Biebel*
ATTY.

Patented July 5, 1949

2,475,291

UNITED STATES PATENT OFFICE 2,475,291

THERMAL RETARDER MECHANISM

Clark M. Osterheld, Stoughton, Wis., assignor to McGraw Electric Company, Elgin, Ill., a corporation of Delaware Application June 11, 1945, Serial No. 598,891

8 Claims. (Cl. 219—39)

My invention relates to electric heating and particularly to control means for electric heaters for hot water tanks.

An object of my invention is to provide a control means for the electric heater of a hot water tank mounted in heat receiving relation on a tank and comprising a single switch, that shall cause closing of said switch in case the control means is subject to cold water in the tank and that shall cause opening of said switch in case the control means is subject to hot water in the tank.

Another object of my invention is to provide a control system for the electric heater of a hot water tank that shall be energized immediately at the beginning of an off-peak period in case the tank contains a substantial quantity of cold water and that shall delay energization of the electric heater for a predetermined time period of delay in case the tank contains a relatively small quantity of cold water.

Another object of my invention is to provide a thermal retarder for use in a water heater control system embodying a first snap-acting bimetal bar assembly adapted to move a contact member into circuit opening position under certain conditions and a second creep type bimetal bar adapted to move said contact member into circuit-closing position against the tendency of said bimetal bar assembly to keep it in circuit-opening position.

Other objects of my invention will either be apparent from a description of several forms of device embodying my invention or will be pointed out in the course of such description and set forth more particularly in the appended claims.

Figure 7:
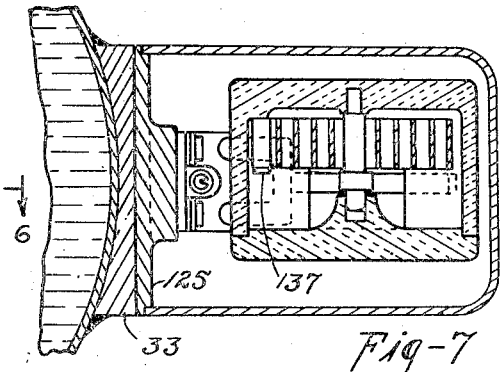
Figure 6:
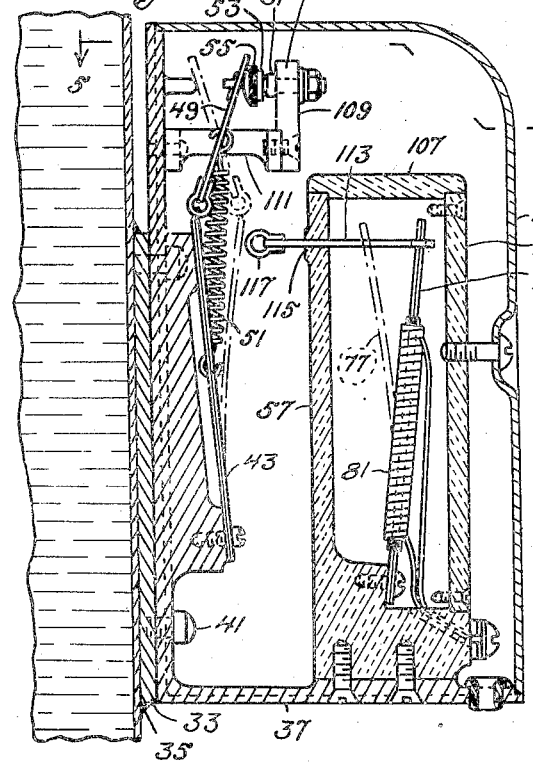

In the drawings,

Figure 1 is a vertical, sectional view of a hot water tank and a diagram of connections of an electric circuit, Fig. 2 is a horizontal, sectional view taken on the line 2—2 of Fig. 3, Fig. 3 is a vertical, sectional view of one form of thermal retarder embodying my invention, Fig. 4 is a horizontal, sectional view taken on the line 4—4 of Fig. 3, Fig. 5 is a horizontal, sectional view taken on the line 5—5 of Fig. 6, Fig. 6 is a vertical, sectional view taken on the line 6—6 of Fig. 5, Fig. 7 is a horizontal, sectional view of a modified form of the retarder taken on the line 7—7 of Fig. 8, and, Fig. 8 is a vertical, sectional view of the device shown in Fig. 7.

Referring first of all to Fig. 1 of the drawings, I have there shown an ordinary domestic hot water tank 11 having a lower cold water inlet pipe 13 as well as an upper hot water outlet pipe 15 secured thereto. The tank 11 may be covered with heat insulation 17 which heat insulation is held in proper operative position around the tank 11 by an outer casing 19.

I provide also preferably, but not necessarily, a single electric heater 21 and if only a single electric heater is provided, I prefer to position it adjacent the lower end of the tank 11 and may locate the heater 21 in a tunnel member 23, all in a manner now well known in the art.

I provide also a lower heater control switch designated generally by numeral 25 which switch includes a bimetal bar 27 having its lower end mounted on a fixed contact 29 while its upper end is adapted to engage with and be disengaged from a contact 31. While I have shown a specific embodiment of a heater control switch 25, I do not desire to be limited thereto but may use any form of control switch which will have the same operation as the switch 25. Switch 25 is designed, constructed and adjusted to close its circuit when it is subject to cold water in the tank and to remain closed until the water to which it is subject reaches a temperature on the order of, say 130° to 140° F. When the temperature of the water to which bimetal bar 27 is subject reaches, say 150° F., the bimetal bar will move so that its upper end is out of engagement with fixed contact 31 substantially as shown by the dashed lines shown in Fig. 1 of the drawings.

Referring now to Figs. 2, 3, and 4, I have there shown one form of device embodying my invention. A block 33 which is preferably made of a metal or alloy having high heat conductivity has an inner surface which has substantially the same contour as the outer contour of tank 11 and which may be held in proper operative position against the outside surface of tank 11 as by welding seams 35.

Bolted against the front flat surface of support 33 is a supporting member 37, of heat-conducting material, which is of substantially L-shape in vertical section having a lower thickened and peculiarly shaped portion 39 which is adapted to be secured against support 33 by a plurality of short-machine screws 41. Portion 39 has an angularly extending front surface having a recess therein and adapted to have secured thereagainst one end portion of a bimetal toggle arm 43 as by at least one short-machine screw 45. The upper movable end of bimetal bar 43 has a pair of pivot plates 47 secured thereto which pivot plates comprise an arcuate intermediate portion and two flat end portions, which latter may be solidly brazed or welded against the outer or upper ends of bimetal bar 43. I provide a second toggle arm 49 which is provided in its lower portion with a longitudinally extending recess and I provide further an over-center spring 51 having its upper end pivotally connected to the arm 49 just beyond the end of the recess. The upper end portion of bimetal bar 43 is also provided with a median longitudinally extending recess to receive the lower end portion of spring 51. The two side pieces of the upper toggle arm 49 are sharpened and are adapted to extend into recesses provided in the pivot plates 47. The design and construction of members 43, 47, 49 and 51 is such that the outer or upper end of the second toggle arm 49 will move with a snap action when subject to predetermined changes of temperature.

I provide a contact bridging member 53 which is secured against the outer surface of a support 55 of electric-insulating material which is loosely pivotally mounted on the outer end of the second toggle arm 49.

I provide a casing 57 of electric- and heat-insulating material having its lower end portion secured in proper operative position against the lower horizontally extending portion of member 37 by a plurality of machine screws 59. On the back wall of casing 57, I mount a pair of fixed contacts 61, which are adapted to be engaged with and disengaged from the contact bridging member 53, and which are connected as shown in Fig. 1.

Contact bridging member 53 will be in engagement with contacts 61 when bimetal bar 43 is subject to cold water as hereinbefore described and will be out of engagement with contacts 61 when subject to hot water in the tank.

I provide also a time controlled switch comprising contact arms 63 and 65 which are adapted to be in conducting engagement with each other during off-peak periods and which are adapted to be out of engagement with each other during on-peak periods. I may use any type of continuously operative timer to effect the above mentioned engagement and disengagement. I provide a pair of supply circuit conductors 67 and 69 of which conductor 67 may be connected to contact arm 63 while contact arm 65 is connected to one of the fixed contacts 61 by a conductor 71. The other fixed contact 61 is connected by a conductor 73 with one terminal of heater coil 21, the other terminal of which is connected to fixed contact 29 of the lower control switch 25. Fixed contact 31 is connected by a conductor 75 with the second supply circuit conductor 69.

Since it is desired to effect energization of heater 21 immediately upon closure of the time controlled switch comprising contact arms 63 and 65 in case sufficient cold water is in tank 11 to subject bimetal bar 43 thereto and since I desire also to effect energization of heater coil 21 with a predetermined time delay period in case only the lower thermal switch 25 is subject to cold water, I provide a second bimetal bar of the creep type to effect this operation.

Referring particularly to Fig. 3 of the drawings, I have there shown a creep type bimetal bar 77 having its lower end fixedly secured against a front surface of member 57 as by screws 79, which bimetal bar has a relatively small, low wattage heating coil 81 insulatedly mounted thereon.

The upper end of bimetal bar 77 has a relatively small opening therethrough, through which opening there extends a rod 83 having two adjustable nuts 85 and 87 mounted thereon on screw threads. The inner end of rod 83 is pivotally connected with the junction of two toggle arms 89 and 91, toggle arm 89 being pivotally supported on a stub shaft 93 supported by a projecting lug 95 fixed against the upper surface of the vertically extending portion of member 37. Over-center spring 97 is connected at its upper end to the stub shaft 93 hereinbefore mentioned and has its lower end connected to a stub shaft or pin 99 which extends into the lower arm 91 intermediate its ends. Normally the toggles 89 and 91 will be in the position shown in full lines in Fig. 3.

One terminal of heating coil 81 is connected by a conductor 101 to conductor 71 while the other terminal of heater coil is connected by a conductor 103 to the fixed contact 29 of switch 25.

Let it now be assumed that the two contact arms 63 and 65 are moved into contact with each other at the start of an off-peak period, which for convenience, may be set at 11:00 p. m. In case bimetal bar 43 is subject to cold water in the tank, it will be in such position that contact bridging member 53 is in engagement with fixed contracts 61 whereby an energizing circuit through heater 21 is closed, this circuit being substantially as follows: from supply circuit conductor 67, through the engaged contact arms 63 and 65, conductor 71, through the contact bridging member 53, contacts 61, conductor 73, heater 21, through the closed switch 25 and from there through conductor 75 to the other supply circuit conductor 69. This will therefore energize heater 21 and this energization will continue until sufficient water in the tank has been heated to a temperature on the order of 150° F., the level of hot water gradually creeping downwardly until bimetal bar 43 is subject to hot water in the tank and will move the contact bridging member 53 into open position substantially as shown by the dashed lines in Fig. 3 of the drawings, whereby the heater is deenergized, and the second toggle arm 49 will be moved against a lug 104 on the lower end of toggle arm 91.

Simultaneously with the energization of heater 21 the low wattage coil 81 is also energized and the design, construction and adjustment of heating coil 81 is such that the temperature of bimetal bar 77 will be increased at the end of, say four or five hours to a value which will cause it to flex in a counter-clockwise direction with the result that the toggle comprising the two arms 89 and 91 will be moved into the opposite position substantially as shown by the dashed lines of Fig. 3 so that contact bridging member 53 will be moved into engagement with fixed contacts 61 whereby the hereinbefore described energizing circuit through heater coil 21 is again closed. The effect of the flexing of bimetal bar 77 in a counter-clockwise direction is that the lower end of toggle arm 91 is moved in a counter-clockwise direction and the upper end portion of toggle arm 49 is moved in a clockwise direction, so that contact bridging member 53 is moved into engagement with fixed contacts 61 substantially as hereinbefore described. It may be here pointed out that the bimetal bar 43 will maintain itself in substantially the position shown by the broken lines in Fig. 3.

Energization of heater 21 will continue until either one or two results occur; if substantially all of the water in the tank is heated to a temperature of 150° before the opening of the time controlled switch, deenergization of heater 21 will be effected by the thermal switch 25 while if less than all of the water in the tank is hot at the time of termination of an off-peak period, which we may assume to be at 6:00 a. m., deenergization of heater 21 is effected by the time controlled contact arms 63 and 65.

The hereinbefore described thermal retarder casing 57 may be provided with a front closing wall 105 and a cover 107 may also be provided. An outer cover 108 may also be provided on member 37.

Referring now to Figs. 5 and 6 of the drawings, I have there shown a modification particularly of the second bimetal bar means. Referring more particularly to Fig. 6 of the drawings, I have there shown that the fixed contacts 61 may be supported by a block of electric-insulating material 109 which is supported by a bracket 111. The second bimetal bar 77 is adapted to be loosely pivotally connected with a push rod 113 which extends outwardly through the rear wall of casing 57 through an opening 115 therein and which may have a pivot plate 117 secured thereagainst, the outer rounded end portion of pivot plate 117 being adapted to engage against the upper end portion of bimetal bar 43 upon flexure of bimetal bar 77 in a counter-clockwise direction sufficient to cause reengagement of contact bridging member 53 with fixed contacts 61 in substantially the same manner and with or without a time delay period as was hereinbefore set forth in connection with the design shown in Figs. 2, 3 and 4.

Referring now to Figs. 7 and 8 of the drawings, I have there shown a still further modification of a device embodying my invention and comprising a bimetal toggle arm 121, the upper end of which is secured as by a machine screw 123 against a part of the front surface of a casing 125 of heat-conducting material which is adapted to be secured by means not shown against the front surface of support 33. A second toggle arm 127 is provided with pivot plates 47 and an overcenter spring 51 may also be provided connected to toggle arms 121 and 127 as hereinbefore described. A contact bridging member 53 is adapted to engage with and be disengaged from a pair of fixed contacts 61 mounted on a block 129, of electric-insulating material, which is secured against an upstanding lug 131 on the inner upper surface of casing 125, as by machine screws 133.

A second bimetal bar 135 is of substantially spiral form, having one of its ends fixedly supported as by a pin 137 projecting into a supporting block 139 which may be made of heat-insulating material. The other end of the spiral bimetal bar 135 has secured thereto an arm 141, the outer end of which fits loosely into a recess in a short rod 143 which rod is adapted to be moved in a left-hand direction upon increase of temperature of the bimetal bar 135. Increase of temperature of the bimetal bar 135 is effected by a low wattage heating coil 145, the design, construction and adjustment of which is such that bimetal bar 135 will be caused to increase in temperature to a value sufficient to have the left-hand end of rod 143 engage the lower end of bimetal toggle arm 121 and cause reengagement of contact bridging member 53 with fixed contacts 61, after contact bridging member 53 has been moved to the position shown by the broken lines in Fig. 8, under the conditions hereinbefore described.

Substantially the same comments made hereinbefore in connection with the design shown in Figs. 2, 3 and 4 apply equally well to the designs shown respectively in Figs. 5 and 6 and in Figs. 7 and 8 and repetition thereof is believed to be unnecessary.

It is evident that the second or creep type bimetal bar is effective to cause reclosure of the heater controlled circuit either with or without a time delay depending upon the amount of cold water in the tank at the start of an off-peak period, against the tendency of the bimetal toggle arm to maintain the contact bridging member in its circuit opening position.

Various modifications may be made in the device embodying my invention without departing from the spirit and scope thereof and all such modifications clearly coming within the scope of the appended claims shall be considered a part of my invention.

I claim as my invention:

1. A thermal retarder comprising a snap-acting bimetal bar assembly, a contact bridging member adapted to be moved into circuit-closing position when the temperature of said bimetal bar assembly is low and to be moved into circuit-opening position when the temperature of said bimetal bar assembly is high and means comprising a creep type bimetal member and an electric heating coil for heating said creep type bimetal member for causing movement of said contact bridging member into circuit-reclosing position a predetermined period of time after energization of said heating coil.

2. A thermal retarder comprising a snap-acting bimetal bar assembly, a contact member carried by said assembly and adapted to be moved into circuit-closing position when the temperature of said assembly is low and to be moved into circuit-opening position when the temperature of said assembly is high and means comprising a thermally-actuable member and an electric heating coil for heating said thermally-actuable member for causing movement of said contact member, when in circuit-opening position, into circuit-closing position a predetermined period of time after energization of said electric heating coil.

3. A thermal retarder for controlling the energization of an electric heater for a hot water tank, adapted to be mounted in heat-receiving relation on a hot water tank, comprising a snap-acting bimetal bar assembly, a contact member carried by said assembly adapted to be moved thereby into circuit-closing position when subject to cold water in the tank and to be moved thereby into circuit-opening position when subject to hot water in the tank and means comprising a thermally-actuable member and an electric heating coil operatively associated with said thermally-actuable member for heating said member to cause movement of said contact member, when in circuit-opening position, into circuit-closing position a predetermined period of time after energization of said electric heating coil.

4. A thermal retarder comprising a snap-acting toggle joint assembly, one of said toggle arms being of bimetal, a contact member carried by said assembly and adapted to be moved into circuit-closing position when the temperature of said assembly is low and to be moved into circuit-opening position when the temperature of said assembly is high and means comprising a creep type bimetal bar, said snap-acting toggle joint assembly being normally in position so that said contact member can move freely into circuit-opening position and adapted to be actuated by said creep type bimetal bar and an electric heating coil insulatedly mounted on and supported by said creep type bimetal bar for causing movement of said contact member into circuit-closing position a predetermined length of time after energization of said heating coil.

5. A thermal retarder for controlling the energization of an electric heater for a hot water tank, adapted to be mounted in heat-receiving relation on a hot water tank, comprising a snap-acting toggle joint assembly, one of said toggle arms being of bimetal, a contact member carried by said assembly adapted to be moved thereby into circuit-closing position when subject to cold water in the tank and to be moved thereby into circuit-opening position when subject to hot water in the tank and means comprising a creep type bimetal bar, said snap-acting toggle joint assembly being normally in position so that said contact member can move freely into circuit-opening position and adapted to be actuated by said creep type bimetal bar and an electric heating element insulatedly mounted on and supported by said creep type bimetal bar, for causing movement of said contact member into circuit-closing position a predetermined length of time after energization of said heating coil.

6. In combination, a movable, circuit-controlling, electric contact, stops for limiting the movement of said contact, at least one of said stops constituting a cooperating, circuit-controlling contact, a snap mechanism for moving said movable contact between said stops, and a thermally actuated snap mechanism for moving one of said stops.

7. In combination, a movable, circuit-controlling, electric contact, stops for limiting the movement of said contact, one of said stops being movable, the other constituting a cooperating electric contact, a thermally-actuated snap mechanism for moving said movable contact between said stops, and a second thermally-actuated, snap mechanism for moving said movable stop toward and away from the other stop.

8. In combination, an electric switch including a contact operating member and a stop therefor, first thermally actuated means for moving said contact operating member between said stop and a circuit-closing position, a snap mechanism for moving said stop for pushing said contact operating member into said circuit-closing position, and second thermally actuated means for operating said snap mechanism.

CLARK M. OSTERHELD.

REFERENCES CITED

The following references are of record in the file of this patent:

UNITED STATES PATENTS

| Number | Name | Date |
| --- | --- | --- |
| 2,175,827 | Conklin | Oct. 10, 1939 |
| 2,210,084 | Kuhn et al. | Aug. 6, 1940 |
| 2,257,887 | Osterheld | Oct. 7, 1941 |